US012700028B2

(12) United States Patent
Baltescu et al.

(10) Patent No.: US 12,700,028 B2
(45) Date of Patent: Aug. 4, 2026

---

(54) MULTI-MODAL PRODUCT EMBEDDING GENERATOR

(71) Applicant: Pinterest, Inc., San Francisco, CA (US)

(72) Inventors: Paul Baltescu, San Mateo, CA (US); Andrew Huan Zhai, San Mateo, CA (US); Haoyu Chen, Sunnyvale, CA (US); Jurij Leskovec, Stanford, CA (US); Nikil Pancha, San Francisco, CA (US); Charles Joseph Rosenberg, Cupertino, CA (US)

(73) Assignee: Pinterest, Inc., San Francisco, CA (US)

( * ) Notice: Subject to any disclaimer, the term of this patent is extended or adjusted under 35 U.S.C. 154(b) by 515 days.

(21) Appl. No.: 18/167,002

(22) Filed: Feb. 9, 2023

(65) Prior Publication Data

US 2023/0252550 A1      Aug. 10, 2023

Related U.S. Application Data

(60) Provisional application No. 63/308,921, filed on Feb. 10, 2022.

(51) Int. Cl.
 G06Q 30/00  (2023.01)
 G06F 16/901  (2019.01)
   (Continued)

(52) U.S. Cl.
 CPC ..... G06Q 30/0631 (2013.01); G06F 16/9024 (2019.01); G06F 16/9038 (2019.01)

(58) Field of Classification Search
 None
 See application file for complete search history.

(56) References Cited

U.S. PATENT DOCUMENTS

| | | | |
|---|---|---|---|
| 10,282,462 B2 | 5/2019 | Magnani et al. | |
| 10,642,887 B2 | 5/2020 | Chen et al. | |

(Continued)

OTHER PUBLICATIONS

Beal, J., et al., "Billion-Scale Pretraining with Vision Transformers for Multi-Task Visual Representations," CoRR abs/2108.05887 (2021). arXiv:2108.05887 URL: https://arxiv.org/abs/2108.05887, 10 pages.

(Continued)

*Primary Examiner* — Mila Airapetian
(74) *Attorney, Agent, or Firm* — Gustafson IP

(57) ABSTRACT

Described are systems and methods for providing a multi-tasked trained machine learning model that may be configured to generate product embeddings from multiple types of product information. The exemplary product embeddings may be generated for a corpus of products (e.g., products included in a product catalog, etc.) based on both image information and text information associated with each respective product. Accordingly, the generated product embeddings may be compatible with learned representations of the different types of product information (e.g., image information, text information, etc.) and may be used to create a product index, which can be used to determine and serve product recommendations in connection with multiple different recommendation services that may be configured to receive different types of inputs (e.g., a single image, multiple images, text-based information, etc.).

20 Claims, 8 Drawing Sheets

(51) Int. Cl.
*G06F 16/9038* (2019.01)
*G06Q 30/0601* (2023.01)

(56) References Cited

U.S. PATENT DOCUMENTS

| | | | | |
|---|---|---|---|---|
| 10,956,787 | B2 | 3/2021 | Rothberg et al. | |
| 11,301,774 | B2 | 4/2022 | Duran et al. | |
| 11,620,512 | B2 * | 4/2023 | Jain | G06F 16/248 |
| | | | | 706/21 |
| 11,769,193 | B2 * | 9/2023 | Klein | G06F 18/24147 |
| | | | | 705/26.7 |
| 2019/0065594 | A1 * | 2/2019 | Lytkin | G06F 16/9536 |
| 2019/0236394 | A1 | 8/2019 | Price et al. | |
| 2020/0311798 | A1 * | 10/2020 | Forsyth | G06N 3/04 |
| 2021/0241343 | A1 * | 8/2021 | Arora | G06Q 30/0633 |
| 2023/0074782 | A1 * | 3/2023 | Tendulkar | G06V 10/776 |
| 2026/0017681 | A1 * | 1/2026 | Ruan | G06Q 30/0202 |

OTHER PUBLICATIONS

Chen, YC., et al., "UNITER: Learning Universal Image-Text Representations," (2019). arXiv:1909.11740v1 URL:https://arxiv.org/abs/1909.11740v1, 13 pages.

Cormode, Graham and Shan Muthukrishnan, "An Improved Data Stream Summary: The Count-Min Sketch and its Applications," Journal of Algorithms 55, 1 (2005), 58-75. https://doi.org/10.1016/j.jalgor.2003.12.001.

Covington, P. et al., Deep Neural Networks for YouTube Recommendations. In RecSys, pp. 191-198, 2016, https://cseweb.ucsd.edu/classes/fa17/cse291-b/reading/p191-covington.pdf.

Devlin, J et al., 2018, BERT: Pre-training of Deep Bidirectional Transformers for Language Understanding. CoRR abs/1810.04805 (2018), arXiv:1810.04805, Retrieved: https://arxiv.org/pdf/1810.04805v1.pdf, 14 pages.

Eksombatchai, C., et al., "Pixie: A System for Recommending 3+ Billion Items to 200+ Million Users in Real-Time," In Proceedings of the 2018 World Wide Web Conference. 1775-1784.

Guo, W., et al., "Deep Multimodal Representation Learning: A Survey," IEEE Access 7 (2019), 63373-63394.

Guo, W., et al., "DeText: A Deep Text Ranking Framework with BERT," CoRR abs/2008.02460 (2020). arXiv:2008.02460 URL: https://arxiv.org/abs/2008.02460, 8 pages.

Hamilton, W.L., et al., "Inductive Representation Learning on Large Graphs," 2018. arXiv:1706.02216 [cs.SI] URL: https://arxiv.org/abs/1706.02216, 19 pages.

Hu, Z., et al., "Heterogeneous Graph Transformer," WWW '20, Apr. 20-24, 2020, Taipei, Taiwan arXiv:2003.01332 [cs.LG] URL: https://arxiv.org/abs/2003.01332, 11 pages.

Huang, Jing, and Brian Kingsbury, "Audio-visual Deep Learning for Noise Robust Speech Recognition," In 2013 IEEE International Conference on Acoustics, Speech and Signal Processing. IEEE, 7596-7599.

Huang, JT., et al., "Embedding-based Retrieval in Facebook Search," In Proceedings of the 26th ACM SIGKDD Conference on Knowledge Discovery and Data Mining (KDD '20), Aug. 23-27, 2020, Virtual Event, CA, USA. ACM, New York, Ny, USA, 9 pages, CoRR abs/2006.11632 (2020). arXiv:2006.11632 URL: https://arxiv.org/abs/2006.11632.

Huang, PS., et al., "Learning Deep Structured Semantic Models for Web Search Using Clickthrough Data," In Proceedings of the 22nd ACM International Conference on Information and Knowledge Management (San Francisco, California, USA) (CIKM '13). Association for Computing Machinery, New York, NY, USA, 2333-2338. https://doi.org/10.1145/2505515.2505665.

Jiang, YG., et al., "Modeling Multimodal Clues in a Hybrid Deep Learning Framework for Video Classification," IEEE Transactions on Multimedia 20, 11 (2018), 3137-3147.

Li, L.H., et al., "VisualBERT: A Simple and Performant Baseline for Vision and Language," arXiv preprint arXiv:1908.03557 (2019) URL: https://arxiv.org/abs/1908.03557, 14 pages.

Liu, X., et al., "Representation Learning Using Multi-Task Deep Neural Networks for Semantic Classification and Information Retrieval," Human Language Technologies: The 2015 Annual Conference of the North American Chapter of the ACL, pp. 912-921, Denver, Colorado, May 31-Jun. 5, 2015. Association for Computational Linguistics.

Liu, Y., et al., "Multimodal Video Classification with Stacked Contractive Autoencoders," Signal Processing 120 (2016), 761-766.

Lu, H., et al., , "Graph-based Multilingual Product Retrieval in E-commerce Search," CoRR abs/2105.02978 (2021). arXiv:2105.02978 URL: https://arxiv.org/abs/2105.02978, 8 pages.

Malkov, Yu. A., and D. A. Yashunin, "Efficient and Robust Approximate Nearest Neighbor Search Using Hierarchical Navigable Small World Graphs," IEEE Transactions on Pattern Analysis and Machine Intelligence 42, 4 (2018), 824-836.

Ngiam, J., Khosla, A., Kim, M., Nam, J., Lee, H. and Ng, A. Y., "Multimodal Deep Learning," In International Conference on Machine Learning (ICML), pp. 689-696, 2011, 8 pages.

Nigam, P., et al., "Semantic Product Search," KDD '19, Aug. 4-8, 2019, Anchorage, AK, USA. CoRR abs/1907.00937 arXiv:1907.00937 URL: http://arxiv.org/abs/1907.00937, 10 pages.

Pal, A., et al., "PinnerSage: Multi-Modal User Embedding Framework for Recommendations at Pinterest," In Proceedings of the 26th ACM SIGKDD International Conference on Knowledge Discovery & Data Mining (Jul. 2020), (KDD '20), Aug. 23-27, 2020, Virtual Event, CA, USA. ACM, New York, NY, USA, URL: https://doi.org/10.1145/3394486.3403280, 10 pages.

Ruder, Sebastian, "An Overview of Multi-Task Learning in Deep Neural Networks," arXiv preprint arXiv:1706.05098 (2017) URL: https://arxiv.org/abs/1706.05098, 14 pages.

Sanh, V., et al., "DistilBERT, A Distilled Version of BERT: Smaller, Faster, Cheaper and Lighter," 33rd Conference on Neural Information Processing Systems (NeurIPS 2019), Vancouver, Canada, arXiv preprint arXiv:1910.01108 URL: https://arxiv.org/abs/1910.01108, 5 pages.

Saqur, R. and K. Narasimhan, "Multimodal Graph Networks for Compositional Generalization in Visual Question Answering," NIPS'20, Proceedings of the 34th International Conference on Neural Information Processing Systems, Dec. 2020, Article No. 258, pp. 3070-3081.

Svenstrup, D.T., et al., "Hash Embeddings for Efficient Word Representations," 31st Conference on Neural Information Processing Systems (NIPS 2017), Long Beach, CA, USA. arXiv preprint arXiv:1709.03933, URL: https://arxiv.org/abs/1709.03933, 9 pages.

Tan, Hao and Mohit Bansal, "LXMERT: Learning Cross-Modality Encoder Representations from Transformers," EMNLP 2019, Conference on Empirical Methods in Natural Language Processing, arXiv preprint arXiv:1908.07490 (2019) URL: https://arxiv.org/abs/1908.07490, 14 pages.

Tang, H., et al., "Progressive Layered Extraction (PLE): A Novel Multi-Task Learning (MTL) Model for Personalized Recommendations," RecSys '20: Proceedings of the 14th ACM Conference on Recommender Systems, Sep. 2020, 269-278, URL: https://doi.org/10.1145/3383313.3412236.

Tian, H., et al., "Multimodal Deep Representation Learning for Video Classification," World Wide Web 22, 3 (2019), 1325-1341.

Virani, A., et al., "Lessons Learned Addressing Dataset Bias in Model-Based Candidate Generation at Twitter," KDD IRS2020, Aug. 23-28, 2020, San Diego, CA, CoRR abs/2105.09293 (2021), arXiv:2105.09293, URL: https://arxiv.org/abs/2105.09293, 9 pages.

Yang, J., et al., "Mixed Negative Sampling for Learning Two-tower Neural Networks in Recommendations," In WWW 20: Companion Proceedings of the Web Conference 2020, Apr. 2020, pp. 441-447, URL: https://doi.org/10.1145/3366424.3386195.

Yi, X., et al., "Sampling-Bias-Corrected Neural Modeling for Large Corpus Item Recommendations," In Thirteenth ACM Conference on Recommender Systems (RecSys '19), Sep. 16-20, 2019, Copenhagen, Denmark. ACM, New York, NY, USA, 9 pages, URL: https://doi.org/10.1145/3298689.3346996.

Ying, R., et al., "Graph Convolutional Neural Networks for Web-Scale Recommender Systems," In KDD '18: Proceedings of the

(56) References Cited

OTHER PUBLICATIONS

24th ACM SIGKDD International Conference on Knowledge Discovery & Data Mining, 2018, pp. 974-983, URL: https://doi.org/10.1145/3219819.3219890.

Zhai, A. et al., 2019, Learning a Unified Embedding for Visual Search at Pinterest. In Proceedings of the 25th ACM SIGKDD International Conference on Knowledge Discovery & Data Mining, KDD 2019, Anchorage, AK, USA, Aug. 4-8, 2019, pp. 2412-2420. https: //doi.org/10.1145/3292500.3330739, Retrieved: https://arxiv.org/pdf/1908.01707.pdf, 9 pages.

Zhang, H., et al., "Towards Personalized and Semantic Retrieval: An End-to-End Solution for E-commerce Search via Embedding Learning," CoRR abs/2006.02282 (2020). arXiv:2006.02282 URL: https://arxiv.org/abs/2006.02282, 10 pages.

Zhao, Z., et al., "Recommending What Video to Watch Next: A Multitask Ranking System," In RecSys '19: Proceedings of the 13th ACM Conference on Recommender Systems, Sep. 2019, pp. 43-51, URL: https://doi.org/10.1145/3298689.3346997.

Zhou, L., et al., "Unified Vision-Language Pre-Training for Image Captioning and VQA," In Proceedings of the AAAI Conference on Artificial Intelligence, vol. 34. 13041-13049.

Zhuang, J., et al., "PinText 2: Attentive Bag of Annotations Embedding," In DLP-KDD 2020, Aug. 24, 2020, San Diego, California, USA, 9 pages.

* cited by examiner

MULTI-MODAL PRODUCT EMBEDDING GENERATOR

CROSS REFERENCE TO PRIOR APPLICATIONS

This application claims priority to and the benefit of U.S. Provisional Patent Application No. 63/308,921, filed on Feb. 10, 2022, which is hereby incorporated by reference herein in its entirety.

BACKGROUND

More and more aspects of the digital world are implemented, determined, or assisted by machine learning. Indeed, social networks, search engines, online sellers, advertisers, and the like, all regularly rely upon the services of trained machine learning models to achieve their various goals. One such use of machine learning systems in social networks includes use in recommendation systems. For example, machine learning systems can be employed to generate learned embeddings for products. However, existing systems that generate such embeddings typically rely on features of a single modality, such as images, text, and the like.

DETAILED DESCRIPTION

Figure 1A:
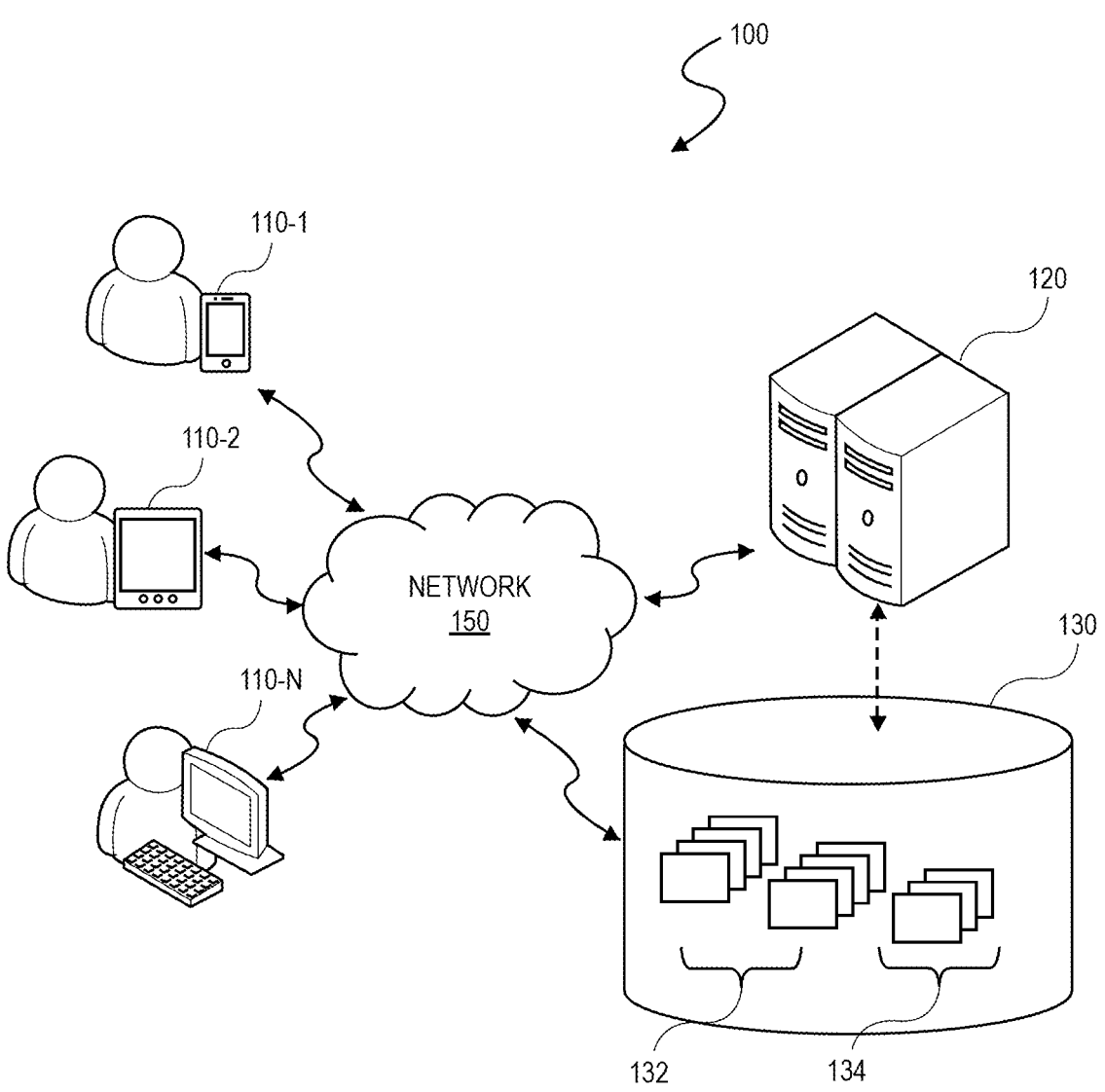
FIGS. 1A and 1B are illustrations of an exemplary computing environment, according to exemplary embodiments of the present disclosure.

As is set forth in greater detail below, exemplary embodiments of the present disclosure are generally directed to systems and methods for providing a multi-tasked trained machine learning model that may be configured to generate product embeddings from multiple types of product information. In exemplary implementations of the present disclosure, the product embeddings may be generated for a corpus of products (e.g., products included in a product catalog, etc.) based on multiple modalities of information (e.g., image information, text information, other product information, etc.) associated with each respective product. Accordingly, the generated product embeddings may be compatible with learned representations of the different types of product information (e.g., image information, text information, other product information, etc.) and may be used to create a product index, which can be used to determine and serve product recommendations in connection with multiple different recommendation services that may be configured to receive different types of inputs (e.g., a single image, multiple images, text-based information, etc.) as queries.

According to exemplary embodiments of the present disclosure, the trained machine learning model may be trained using a labeled training data set that includes pairs of queries and engaged products. The queries can correspond to various types of queries (e.g., one or more images submitted as queries, text-based queries, product queries, etc.) submitted in connection with various recommendation services, and the types of engagements associated with the engaged products can correspond to different task objectives products with which a user may have engaged (e.g., clicked, saved, added to a cart, purchased, etc.). Accordingly, the machine learning model may be trained with multiple training objective tasks that correspond to the different types of engagements. Additionally, the training data set may include negative training data, which may include a random sampling of products, as well as certain in-batch positive labeled products. Once trained, the trained machine learning system may be configured to generate product embeddings based on input product information that includes image product information and text product information. In exemplary implementations, the product embeddings may be inferred offline, in-batch for a corpus of products (e.g., one or more product catalogs, etc.) and a product index may be created with the inferred product embeddings.

According to exemplary implementations of the present disclosure, the generated product embeddings may be compatible with learned representations of images and learned representation of text queries, such that a distance between the learned representation of an image or a text query and a product embedding may represent a relevance of the product embedding to the image or the text query. Optionally, the learned representations of images and the learned representation of text queries may be incompatible with each other. Accordingly, the generated product embeddings can be utilized to serve product recommendations in connection with one or more recommendation services that may be configured to receive different query types (e.g., one or more images, text-based queries, etc.) as inputs. Additionally, the product embeddings may also be utilized as a feature in connection with one or more classification models configured to infer further product information (e.g., category, gender, etc.) that may not be known and/or associated with a product and a feature in one or more ranking models configured to determine rankings of recommended products.

Advantageously, exemplary embodiments of the present disclosure can facilitate generating product embeddings based on information of multiple types/modalities utilizing a machine learning model trained using multi-task learning. Consequently, the exemplary product embeddings may be optimized for multiple types of engagement and may be compatible with learned representations of various types (e.g., an image embedding, a text embedding, etc.). Further, the compatibility of the product embeddings with learned representations of various types can support multiple recommendation services that may be configured to receive different types of inputs in determining and retrieving recommended products. The ability to support multiple recommendation services configured to receive different query types can accordingly reduce infrastructure and maintenance costs associated with supporting each recommendation service individually. Further, although exemplary embodiments of the present disclosure are primarily described in connection with generating user embeddings in connection with recommendation services, search services, and the like, exemplary embodiments of the present disclosure are also applicable to other implementations employing the generation of embeddings that are concise representations of products, content items, and the like.

Figure 1B:
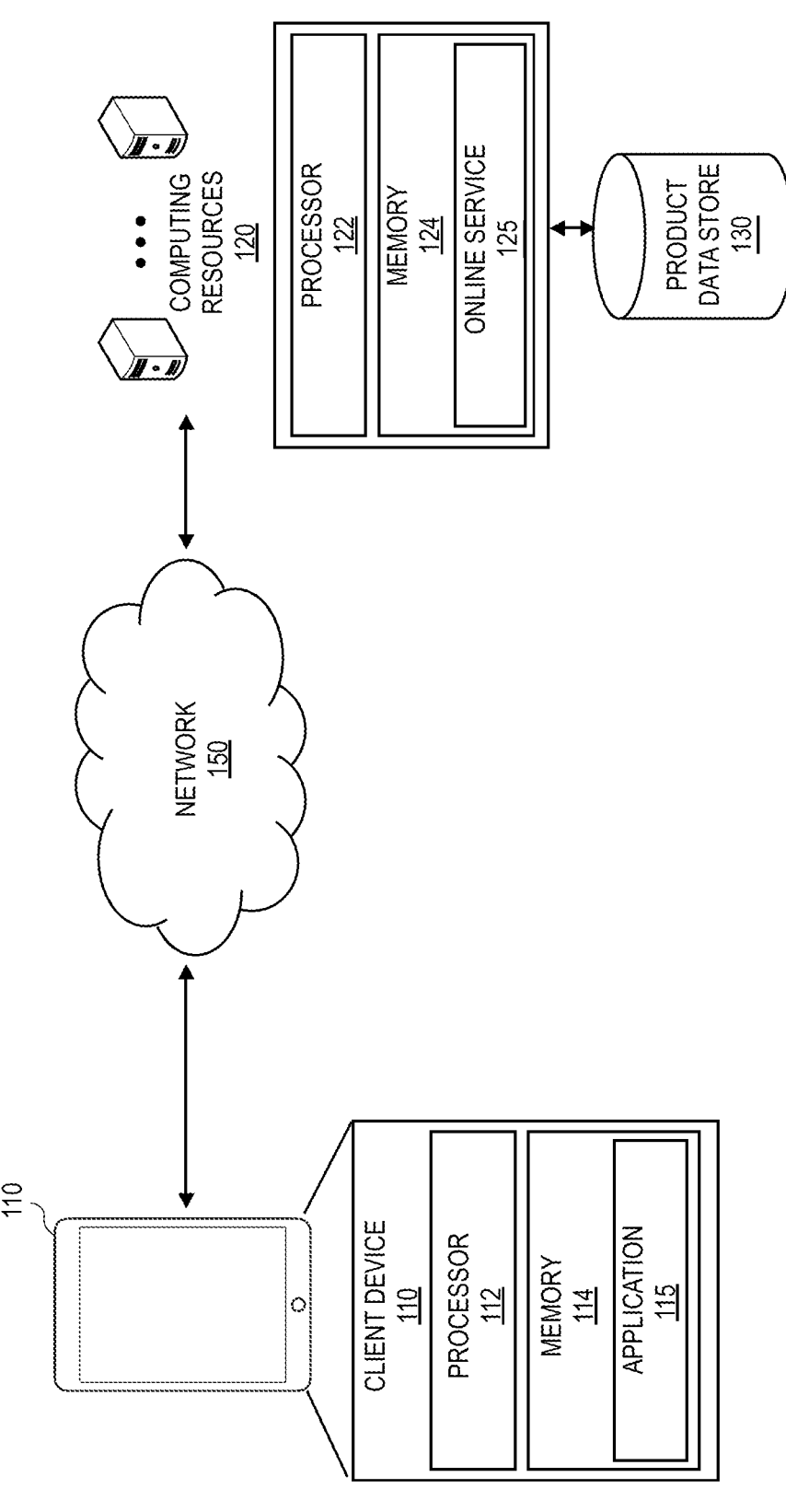

FIGS. 1A and 1B are illustrations of an exemplary computing environment 100, according to exemplary embodiments of the present disclosure.

As shown in FIGS. 1A, computing environment 100 may include one or more client devices 110 (e.g., client device 110-1, 110-2, through 110-N), also referred to as user devices, for connecting over network 150 to access computing resources 120. Client devices 110 may include any type of computing device, such as a smartphone, tablet, laptop computer, desktop computer, wearable, etc., and network 150 may include any wired or wireless network (e.g., the Internet, cellular, satellite, Bluetooth, Wi-Fi, etc.) that can facilitate communications between client devices 110 and computing resources 120. Computing resources 120 may represent at least a portion of a networked computing system that may be configured to provide online applications, services, computing platforms, servers, and the like, such as a social networking service, social media platform, e-commerce platform, content recommendation services, search services, and the like, that may be configured to execute on a networked computing system. Further, computing resources 120 may communicate with one or more datastore(s) 130, which may be configured to store and maintain a corpus of content items 132 and/or a corpus of products 134. According to exemplary embodiments of the present disclosure, each product of corpus of products 134 may correspond to a product offered for sale and/or available for purchase and may include both image features and/or information (e.g., multiple images representing the product in various views, angles, colors, contexts, etc.) and text-based features and/or information (e.g., description information, title information, brand information, type information, pattern information, size information, location information, category information, and the like).

According to exemplary implementations of the present disclosure, computing resources 120 may be representative of computing resources that may form a portion of a larger networked computing platform (e.g., a cloud computing platform, and the like), which may be accessed by client devices 110. Computing resources 120 may provide various services and/or resources and do not require end-user knowledge of the physical premises and configuration of the system that delivers the services. For example, computing resources 120 may include "on-demand computing platforms," "software as a service (SaaS)," "infrastructure as a service (IaaS)," "platform as a service (PaaS)," "platform computing," "network-accessible platforms," "data centers," "virtual computing platforms," and so forth. Example components of a remote computing resource which may be used to implement computing resources 120 is discussed below with respect to FIG. 6.

As illustrated in FIG. 1A, one or more of client devices 110 may access computing resources 120, via network 150, to access and/or execute applications and/or content in connection with a social networking service, social media platform, e-commerce platform, content recommendation service, search service, and the like. According to exemplary embodiments of the present disclosure, client devices 110 may access and/or interact with one or more services executing on remote computing resources 120 through network 150 via one or more applications operating and/or executing on client devices 110. For example, users associated with client devices 110 may launch and/or execute an application on client devices 110 to access and/or interact with services executing on remote computing resources 120 through network 150. According to aspects of the present disclosure, a user may, via execution of the application on client devices 110, access or log into services executing on remote computing resources 120 by submitting one or more credentials (e.g., username/password, biometrics, secure token, etc.) through a user interface presented on client devices 110.

Once logged into services executing on remote computing resources 120, the user associated with one of client devices 110 may submit a request for products (or other content items, etc.), submit searches and/or queries, and/or otherwise consume content items hosted and maintained by services executing on remote computing resources 120. For example, the request for products and/or content items may include a query (e.g., a text-based query, an image-based query, etc.), a request to access a homepage and/or home feed, an interaction with a product and/or content item, other request for recommended products and/or content items, and the like. Alternatively and/or in addition, services executing on remote computing resources 120 may push products and/or content items to client devices 110. For example, services executing on remote computing resources 120 may push products and/or content items to client devices 110 on a periodic basis, after a certain time has elapsed, based on activity associated with client devices 110, upon identification of relevant and/or recommended products and/or content items, and the like.

Accordingly, services executing on remote computing resources 120 may employ one or more trained machine learning models to determine and identify products and/or content items (e.g., from corpus of content items 132 and/or corpus of products 134) that are responsive to the request for products and/or content items (e.g., as part of a query, a request to access a homepage and/or home feed, a request for recommended products and/or content, or any other request for products and/or content items) or a determination that products and/or content items are to be pushed to client devices 110. In exemplary implementations, the one or more trained machine learning models may be configured to generate product embeddings for products of corpus of products 134, which may be used to create a product index that may be used to identify, retrieve, and present recommended products from corpus of products 134 to a user on client devices 110 in response to a request for products and/or content items. The trained machine learning models may be trained utilizing input data of multiple different modalities (e.g., image-based input data, text-based input data, other product information, etc.) and multi-task learning, so that the product embeddings generated by the trained machine learning model may be compatible with learned representations of different modalities, such that a distance between the learned representation of the different modalities (e.g., image embeddings, text embeddings, etc.) and a product embedding may represent a relevance of the product embedding to the image or the text query, and may be optimized for multiple types of engagements. Optionally, the learned representations of the different modalities may be incompatible with each other. Accordingly, the product embeddings generated by the trained machine learning model may be utilized to support multiple recommendation services configured to receive different input modalities as queries to identify, retrieve, and return product recommendations (e.g., from corpus of products 134) to a user on one or more of client devices 110. According to certain aspects of the present disclosure, the exemplary product embeddings may also be utilized as features in determining rankings associated with the identified recommended products, as well as in connection with a classifier, to infer additional product information (e.g., category, gender, etc.) in connection with products included in corpus of products 134. Further, the trained machine learning model may be configured to periodically generate product embeddings for each product offline, in-batch.

According to exemplary embodiments of the present disclosure, the product embeddings generated by the exemplary trained machine learning model may be used to create a product index, which may be used in the identification and/or retrieval of recommended products to users of client devices 110. For example, product embeddings may be generated for each product of corpus of products 134, and the product embeddings may be stored and maintained as a hierarchical navigable small worlds (HNSW) graph, which may be searched (e.g., nearest neighbor search techniques, etc.) using queries received in connection with various recommendation services to identify recommended products to provide to the users of client devices 110. Further, the product embeddings may be periodically generated (e.g., offline, in-batch, etc.) to update the product embeddings based on new information that may have been obtained in connection with the products and to generate product embeddings for new products that have been ingested into corpus of products 134. The updated product embeddings may be used to create, update, modify, and/or maintain the product index. According to certain aspects of the present disclosure, the product embeddings may also be provided to other downstream systems, applications, services, and the like, such as a ranking service configured to rank identified recommended products and/or a classification model configured to infer further product information (e.g., category, gender, etc.) in connection with products included in corpus of products 134.

FIG. 1B is a block diagram of an exemplary computing environment 100, including client device 110 and computing resources 120, which may be configured to implement online service 125, according to exemplary embodiments of the present disclosure. The exemplary system shown in FIG. 1B may facilitate implementation of a social media platform, a social networking service, a recommendation service, a search service, an e-commerce platform, and the like.

As illustrated, client device 110 may be any portable device such as a tablet, cellular phone, laptop, wearable, etc. Client device 110 may be connected to network 150 and may include one or more processors 112 and one or more memory 114 or storage components 130 (e.g., a database or another data store). Further, client device 110 may execute application 115, which may be stored in memory 114, by the one or more processors 112 of client device 110 to cause the processor(s) 112 of client device 110 to perform various functions or actions. According to exemplary embodiments of the present disclosure, application 115 may execute on client device 110 in connection with a social media platform, a social networking service, a recommendation service, a search service, an e-commerce platform, and the like, which may be further implemented via online service 125, executing on computing resources 120. For example, when executed, application 115 may verify the identity of the user, connect to online service 125, submit a request for products and/or content items, submit queries, and the like.

Application 115 executing on client device 110 may communicate, via network 150, with online service 125, which may be configured to execute on computing resources 120. Generally, online service 125 includes and/or executes on computing resource(s) 120. Likewise, computing resource(s) 120 may be configured to communicate over network 150 with client device 110 and/or other external computing resources, data stores, such as content item data store 130, user action data store 140, and the like. As illustrated, computing resource(s) 120 may be remote from client device 110 and may, in some instances, form a portion of a network-accessible computing platform implemented as a computing infrastructure of processors, storage, software, data access, and so forth, via network 150, such as an intranet (e.g., local area network), the Internet, etc.

The computing resources may also include or connect to one or more data stores, such as product data store 130, and the like. Product data store 130 may be configured to store and maintain a corpus of products including one or more products (e.g., products 134). For example, the products stored and maintained may include products that may be accessed via online service 125 for purchase by users of content device 110. Further, each product may include associated image features and/or information (e.g., multiple images representing the product in various views, angles, colors, contexts, etc.) and text-based features and/or information (e.g., description information, title information, brand information, type information, pattern information, size information, location information, category information, and the like). According to exemplary embodiments of the present disclosure, the products stored and/or maintained in product data store 130 may include product embeddings generated by the one or more trained machine learning models employed by online service 125.

It should be understood that the computers, servers, data stores, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" or generate an item, template, annotated image, patient image, and/or any other aspect of the present disclosure.

Figure 2A:
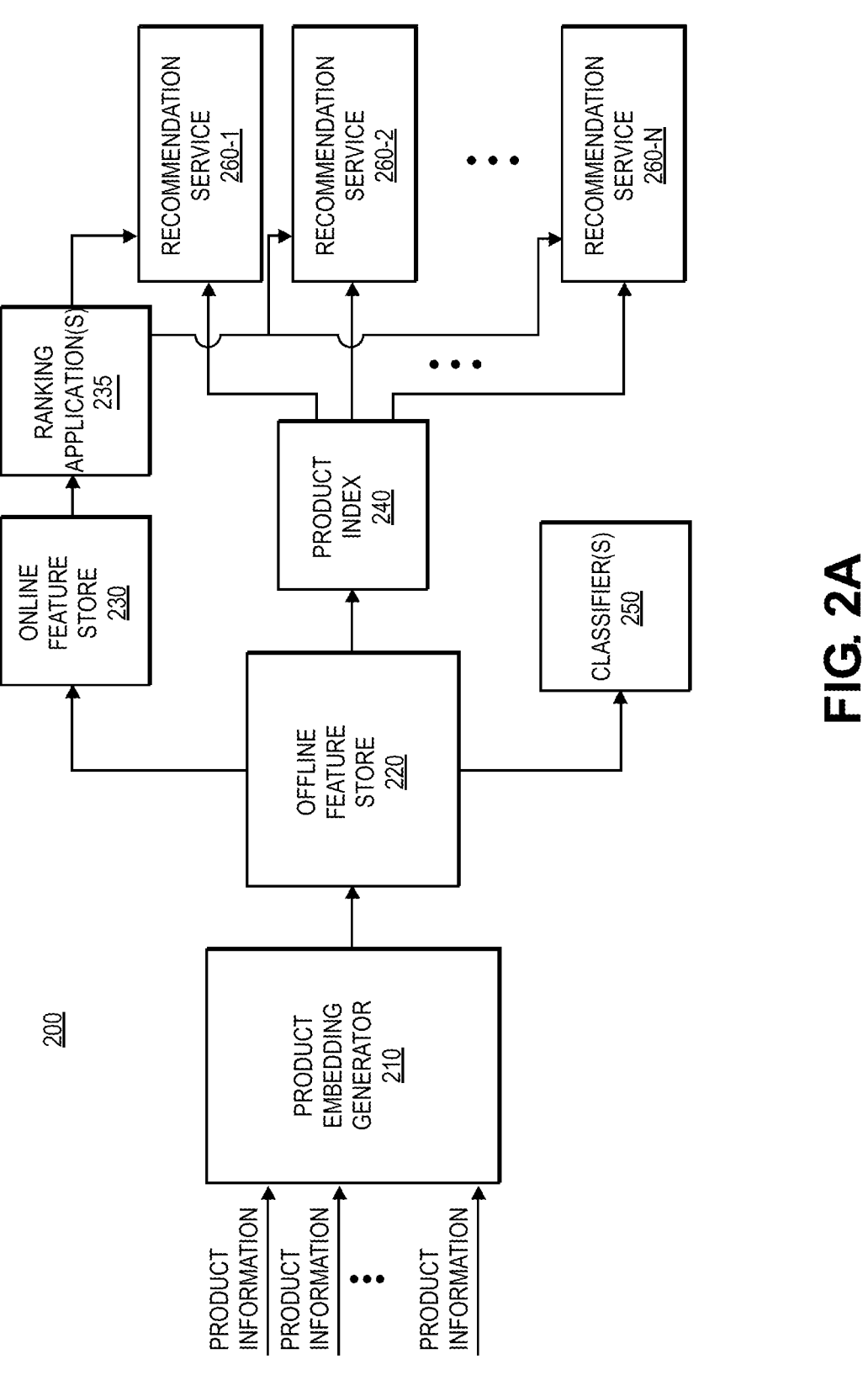
FIG. 2A is a block diagram illustrating an exemplary workflow, according to exemplary embodiments of the present disclosure.

FIG. 2A is a block diagram illustrating an exemplary workflow 200, according to exemplary embodiments of the present disclosure.

As shown in FIG. 2A, exemplary workflow 200 may include providing product information associated with one or more products to product embedding generator 210 to generate a product embedding corresponding to each product. In the implementation illustrated in FIG. 2A, each input product information may be associated with a corresponding product (e.g., of a corpus of products, etc.) and may include product information of various forms, such as, for example, image information associated with the corresponding product (e.g., images showing the product in different views, contexts, colors, sizes, etc.), text information associated with the corresponding product (e.g., descriptions, titles, materials, brands, colors, patterns, sizes, size type, specifications, dimensions, compatibilities, origin, etc.), and other product information (e.g., pricing information, stock keeping unit (SKU) number, model number, etc.). Accordingly, product embedding generator 210 may include one or more trained machine learning models configured to generate product embeddings based on product information that includes more than one modality of product information (e.g., image information, text information, other product information, etc.). Further, product embedding generator 210 may have been trained using multi-task objective learning, so as to optimize the product embeddings for more than one objective (e.g., types of engagement, etc.). Product embedding generator 210 is described in further detail herein in connection with at least FIG. 2B.

In the exemplary implementation illustrated in FIG. 2A, product embedding generator 210 may generate a product embedding for each product for which product information is provided to product embedding generator 210. According to certain embodiments of the present disclosure, product embeddings may be generated on a periodic basis (e.g., daily, weekly, monthly, upon a determination that a threshold number of new products have been ingested into the corpus of products, upon a determination that a threshold number of products have been updated with new product information, etc.) for a corpus of products (e.g., products included in a product catalog, etc.) offline, in-batch. In exemplary implementations of the present disclosure, the product embeddings generated, based on the product information associated with a plurality of corresponding products, by product embedding generator 210 may be provided to offline feature store 220. As illustrated, the product embeddings may be provided from offline feature store 220 to online feature store 230 and classifier(s) 250. Additionally, the product embeddings may also be used to create product index 240.

According to exemplary embodiments of the present disclosure, the product embeddings may be provided as signals and/or features from offline feature store 220 to one or more classifiers 250 to infer product information (e.g., category, gender, etc.) in connection with one or more products. For example, one or more machine learning models may be trained in conjunction with, or in addition to, product embedding generator 210 as a separate classifier(s) 250 and/or a single end-to-end learned classifier 250 configured to infer certain classifications (e.g., type of product, category of product, intended consumer gender, etc.) for products based on the corresponding product embeddings generated by product embedding generator 210. Accordingly, classifier(s) may be configured to infer certain product information for various products that may not be known and/or associated with the product based on the corresponding product embeddings generated by product embedding generator 210.

Additionally, as illustrated in FIG. 2A, the product embeddings generated by product embedding generator 210 may also be used to create product index 240 and be provided to online feature store 230 to support one or more recommendation services 260 (e.g., recommendation service 260-1, 260-2, through 260-N). According to exemplary embodiments of the present disclosure, product index 240 may be created using the product embeddings generated for a corpus of products to facilitate searching, identifying, and retrieving one or more relevant and/or responsive products in response to a request for products. For example, product index 240 may include a hierarchical navigable small worlds (HNSW) graph, where each node and/or vertex of the graph may represent a product of the corpus of products and a measurement of proximity between the nodes and/or vertices can correspond to a similarity measurement between the various products represented at the various nodes and/or vertices of the HNSW graph. Accordingly, in view of the compatibility of the product embeddings with learned representations of different modalities (e.g., image embeddings, text embeddings, etc.), the HNSW graph may be searched (e.g., nearest neighbor search techniques, etc.) based on inputs, queries, requests, etc. received in connection with recommendation services 260 to identify and retrieve recommended products to provide to in response to the inputs, queries, requests, etc. According to certain aspects of the present disclosure, the learned representations of the various different modalities (e.g., image embeddings, text embeddings, etc.) may be incompatible with each other (e.g., a distance of between the embeddings are not meaningful with respect to relevance of the embeddings, etc.). Additionally, the product embeddings provided to online features store 230 may be provided as signals and/or features to one or more ranking applications 235, which may be configured to determine a ranking and/or order of the recommended products identified using product index 240 in provisioning the identified recommended products to recommendation services 260.

As shown in FIG. 2A, the product embeddings generated by product embedding generator 210 may be configured to support multiple recommendation services 260. Each recommendation service 260 may be configured to receive an input, query, request, etc. and, based on the input, query, request, etc., determine, identify, and/or retrieve recommended products responsive to the input, query, request, etc. According to exemplary embodiments of the present disclosure, recommendation services 260 may be associated with various applications, services, products, and the like provided in connection with an online service and/or application, such as a social media platform, a social networking service, a recommendation service, a search service, an e-commerce platform, and the like. Further, each recommendation service 260 may be configured to receive a different input, query, and/or request type. For example, recommendation service 260-1 may be associated with a homepage and/or home feed provided by the online service and/or application and may be configured to receive a request and/or query that includes a sequence of images (e.g., as a sequence of learned representations, such as image embeddings, that represent each image of the sequence of images, etc.), a sequence of products (e.g., as a sequence of product embeddings representative of the sequence of products, etc.), etc. that corresponds to a user's history and/or past activity and determine, identify, and/or retrieve recommended products based on the sequence of images, products, and the like. Further, recommendation service 260-2 may be associated with a service provided by the online service and/or application and may be configured to provide recommendations based on an interaction with a content item and/or a product by a user. Accordingly, recommendation service 260-2 may be configured to receive a request and/or query that includes an image (e.g., a learned representation that is representative of the content item with which the user interacted, such as an image embedding, etc.), a product (e.g., a product embedding representative of the product, etc.), and the like, and determine, identify, and/or retrieve recommended products based on the image, the product, and the like. According to yet another aspect of the present disclosure, recommendation service 260-N may be associated with a search service provided by the online service and/or application and may be configured to provide recommendations based on a query provided by a user. For example, recommendation service 260-N may be configured to receive a text query (e.g., a learned representation that is representative of the text query, such as a text embedding, etc.), an image query (e.g., a learned representation that is representative of the content item with which the user interacted, such as an image embedding, etc.), and the like, and determine, identify, and/or retrieve recommended products based on the query.

In exemplary implementations where recommendation service 260-1 may be associated with a homepage and/or home feed provided by the online service and/or application and may be configured to receive a request and/or query that includes a sequence of images or products, a user may access a homepage and/or home feed associated with the user in connection with accessing an online service, such as a social media platform, a social networking service, a recommendation service, a search service, an e-commerce platform, and the like. Accessing the user's homepage and/or home feed may generate a request to recommendation service 260-1 to determine recommended products to present to the user in response to the user's request to access the homepage and/or home feed. The request may also include, for example, a sequence of embeddings, or other learned representations, representative of content items, images, products, and the like with which the user may have recently engaged and/or interacted (e.g., clicked, saved, liked, reacted to, commented on, and the like). The sequence of image embeddings may be aggregated (e.g., weighted average, provided to a sequential trained machine learning model to generate a concise representation of the sequence of image embeddings, and the like) and used to search product index 240 to identify recommended products to present to the user. According to exemplary embodiments of the present disclosure, in view of the compatibility of the product embeddings with learned representations of different modalities (e.g., image embeddings, text embeddings, etc.), a nearest neighbor search technique (e.g., k nearest neighbor search, approximate nearest neighbor search, locality-sensitivity hashing technique, and the like) may be employed to identify recommended products using product index 240. For example, product index 240 may include an HNSW graph and the nearest neighbor search may be implemented by determining a similarity measure (e.g., using a cosine similarity measure, a Hamming distance, a Euclidean distance measure, and the like) between the sequence of image embeddings and the product embeddings of product index 240 to identify one or more nearest neighbors to the sequence of image embeddings as the recommended products. Alternatively and/or in addition, a random walk may be performed from one of the identified nearest neighbors to identify one or more additional products to provide as recommended products. Additionally, the identified recommended products may be ranked and/or ordered by one or more ranking applications 235 based on the product embeddings obtained from online feature store 230. Accordingly, the ranked and/or ordered recommended products may be provided by recommendation service 260-1 and presented to the user in accordance with the determined rankings and/or ordering of the recommended products.

In exemplary implementations where recommendation service 260-2 may be configured to receive a request and/or query that includes an image, a product, and the like, recommendation service 260-2 may operate in a similar manner to recommendation service 260-1. For example, a user may interact with a content item, an image, a product, etc. hosted and/or maintained by an online service, such as a social media platform, a social networking service, a recommendation service, a search service, an e-commerce platform, and the like. Interacting with the content item, image, product, etc. hosted and/or maintained by the online service may generate a request to recommendation service 260-2 to determine recommended products to present to the user in response to the user's interaction with the content item, image, product, and the like. The request may also include, for example, an embedding, or other learned representation, representative of the content item, image, product, etc. with which the user may have engaged and/or interacted (e.g., clicked, saved, liked, reacted to, commented on, and the like). The image embedding may be used to search product index 240 to identify recommended products to present to the user. According to exemplary embodiments of the present disclosure, in view of the compatibility of the product embeddings with learned representations of different modalities (e.g., image embeddings, text embeddings, etc.), a nearest neighbor search technique (e.g., k nearest neighbor search, approximate nearest neighbor search, locality-sensitivity hashing technique, and the like) may be employed to identify recommended products using product index 240. For example, product index 240 may include an HNSW graph and the nearest neighbor search may be implemented by determining a similarity measure (e.g., using a cosine similarity measure, a Hamming distance, a Euclidean distance measure, and the like) between the image embedding and the product embeddings of product index 240 to identify one or more nearest neighbors to the image embedding as the recommended products. Alternatively and/or in addition, a random walk may be performed from one of the identified nearest neighbors to identify one or more additional products to provide as recommended products. Additionally, the identified recommended products may be ranked and/or ordered by one or more ranking applications 235 based on the product embeddings obtained from online feature store 230. Accordingly, the ranked and/or ordered recommended products may be provided by recommendation service 260-2 and presented to the user in accordance with the determined rankings and/or ordering of the recommended products.

In yet another exemplary implementation where recommendation service 260-N may be associated with a search service provided by the online service and/or application and may be configured to provide recommendations based on a query (e.g., text, image, product, etc.), may operate in a similar manner to recommendation service 260-1. For example a user may submit a query to an online service, such as a social media platform, a social networking service, a recommendation service, a search service, an e-commerce platform, and the like. Submitting the query may generate a request to recommendation service 260-N to determine recommended products to present to the user in response to the user's query. The request may also include, for example, an embedding, or other learned representations, representative of the query submitted by the user. The embedding may be used to search product index 240 to identify recommended products to present to the user. According to exemplary embodiments of the present disclosure, in view of the compatibility of the product embeddings with learned representations of different modalities (e.g., image embeddings, text embeddings, etc.), a nearest neighbor search technique (e.g., k nearest neighbor search, approximate nearest neighbor search, locality-sensitivity hashing technique, and the like) may be employed to identify recommended products using product index 240. For example, product index 240 may include an HNSW graph and the nearest neighbor search may be implemented by determining a similarity measure (e.g., using a cosine similarity measure, a Hamming distance, a Euclidean distance measure, and the like) between the text embedding and the product embeddings of product index 240 to identify one or more nearest neighbors to the text embedding as the recommended products. Alternatively and/or in addition, a random walk may be performed from one of the identified nearest neighbors to identify one or more additional products to provide as recommended products. Additionally, the identified recommended products may be ranked and/or ordered by one or more ranking applications 235 based on the product embeddings obtained from online feature store 230. Accordingly, the ranked and/or ordered recommended products may be provided by recommendation service 260-N and presented to the user in accordance with the determined rankings and/or ordering of the recommended products.

Figure 2B:
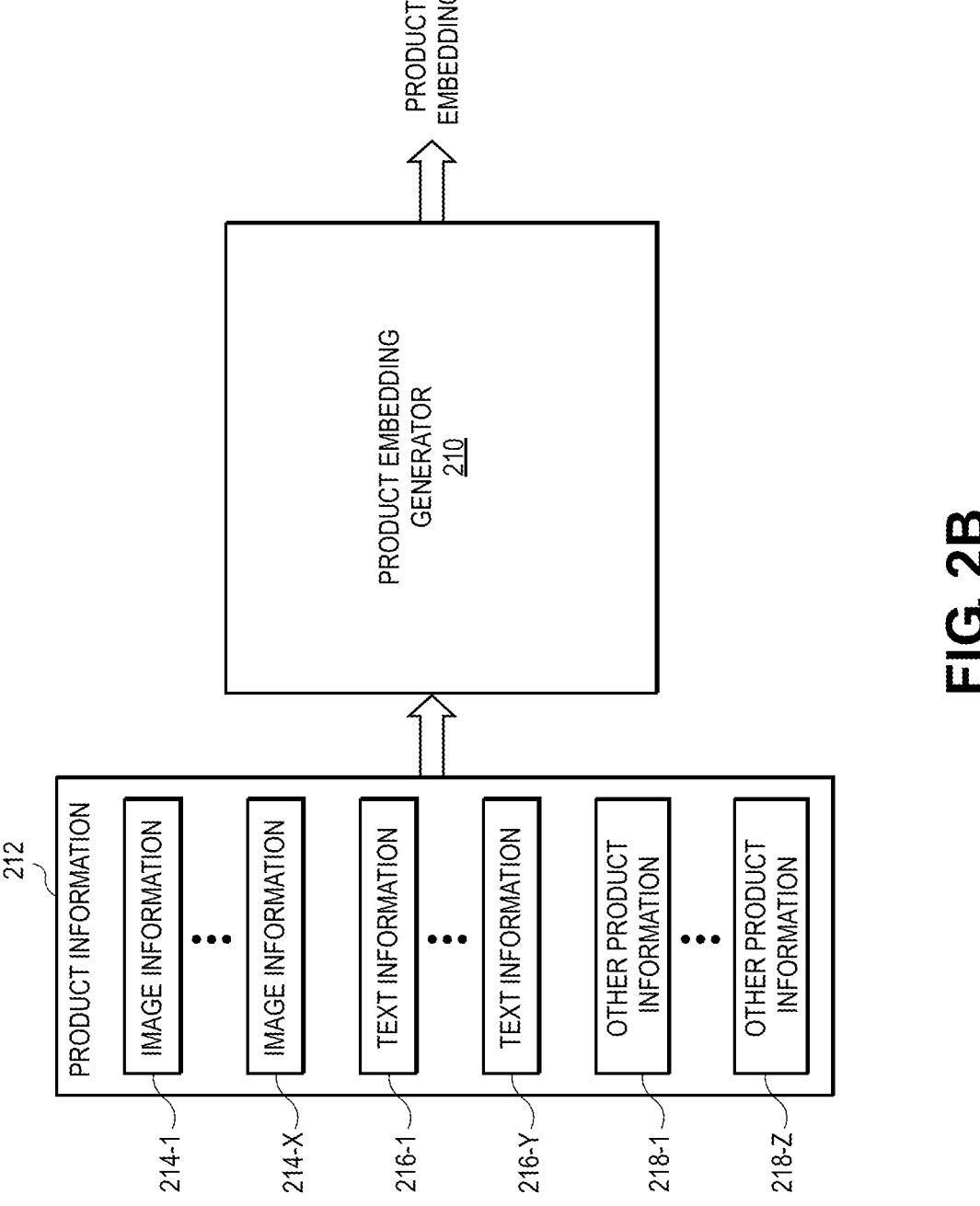
FIG. 2B is a block diagram illustrating an exemplary product embedding generator, according to exemplary embodiments of the present disclosure.

FIG. 2B is a block diagram illustrating an exemplary product embedding generator 210, according to exemplary embodiments of the present disclosure.

As shown in FIGS. 2A and 2B, product embedding generator 210 may include one or more trained machine learning models that are configured to generate a product embedding for a product based on product information provided as an input to product embedding generator 210. Accordingly, each product information shown in FIG. 2A may be associated with a corresponding product and may include various product information of various modalities, (e.g., image, text, and other product information, etc.). As shown in FIG. 2B, product information 212 may be associated with a particular product of a corpus of products (e.g., a product catalog, etc.) and may correspond to any one of product information shown in FIG. 2A. Further, product information 212 may include one or more image information 214 (e.g., image information 214-1 through 214-X), one or more text information 216 (e.g., text information 216-1 through 216-Y), and one or more other product information 218 (e.g., other product information 218-1 through 218-Z) associated with the particular product. For example, image information 214 may include different images of the particular product in various views, angles, contexts, colors, sizes, and the like, text information 216 may include text-based features and/or information associated with the particular product, such as description information, title information, brand information, type information, pattern information, size information, location information, category information, material information, color information, dimension information, specification information, and the like, and other product information 218 may include other product information, such as pricing information, stock keeping unit (SKU) number, model number, and the like. As illustrated in FIGS. 2A and 2B, product embedding generator 210 may be configured to generate a product embedding for the particular product based on the image information 214, the text information 216, and other product information 218.

In exemplary implementations, image information 214, text information 216 and other product information 218 may be provided to product embedding generator 210 as a sequence of embeddings (e.g., image embeddings, text embeddings, etc.) representing the image, text features, and/or other product information associated with the product as its input in generating the product embeddings. According to exemplary embodiments of the present disclosure, a linear transformation may be applied to each of the set of image embeddings and the set of text embeddings. The transformed embeddings may then be concatenated with a global token and passed through a transformer encoder. The output may be processed by a multilayer perceptron (MLP) to produce the product embedding, which may be $L_2$ normalized to facilitate computations associated with determining similarity measures (e.g., cosine similarity, etc.).

According to exemplary embodiments of the present disclosure, product embedding generator 210 may be configured to receive a predetermined number of images, text features, and/or other product information in generating the product embeddings. In scenarios where the number of images associated with a product exceeds the predetermined number of images, one or more images may simply be removed, so that the number of images provided to product embedding generator 210 does not exceed the predetermined number, and in situations where the number of images associated with a product is less than the predetermined number of images, the difference between the number of images and the predetermined number of images may be represented by zero embeddings. For example, in an exemplary implementation where product embedding generator 210 is configured to receive 10 images, if a certain product has 15 associated images, 5 images (e.g., image embeddings or other learned representation of the images) may be removed from the set of images and the remaining 10 images may be provided to product embedding generator 210 to generate a product embedding for the product. Continuing the example implementation where product embedding generator 210 is configured to receive 10 images and a certain product has 8 associated images, the 8 associated images (e.g., image embeddings or other learned representation of the images), along with 2 zero embeddings, may be provided to product embedding generator 210 to generate a product embedding for the product.

With respect to the text information, product embedding generator 210 may be further configured to receive a predetermined number of text features in generating the product embeddings. In certain implementations where a product may be associated with multiple values for a particular feature, multiple text feature values for the particular feature may be concatenated into a single string. Each string may be tokenized and represented as a bag of word unigrams, bigrams, trigrams, etc., which may be mapped to a vocabulary.

According to certain aspects of the present disclosure, the image embeddings and text embeddings provided as an input to product embedding generator 210 may be generated by one or more pretrained machine learning models. Alternatively and/or in addition, the image embeddings and/or the text embeddings may be learned jointly with product embedding generator 210. In an exemplary implementation where the text embeddings may be jointly learned with product embedding generator 210, a hash embedding technique may be employed. For example, hashing functions $h_1$ and $h_2$ may be utilized to map each token i of a vocabulary into an embedding table, which may be represented as $h_1(i)$ and $h_2(i)$. A weight table may be applied, such that the embedding of token i may be the weighted interpolation of two embeddings, which may be represented as: $W_{i1}E_{h_1(i)} + W_{i2}E_{h_2(i)}$. In such an implementation, the embedding of a text string can include a summation of all the embeddings corresponding to the tokens in the text string.

Further, product embedding generator 210 may be trained utilizing multi-task learning with labeled training data having information from both image and text modalities. For example, product embedding generator 210 may be trained utilizing training data corresponding to multiple different types of engagement. Accordingly, product embeddings learned by product embedding generator 210 may be optimized for the multiple different types of engagement.

According to exemplary embodiments of the present disclosure, a training dataset may be generated based on query and engaged product pairs. For example, positive training data may include labeled query and engaged product pairs, where each query-product pair may include a query and a corresponding product (from the corpus of products) with which users engaged and/or interacted in response to the respective query. The queries may include queries of different modalities (e.g., image-based queries, text-based queries, etc.), and the type of engagement and/or interaction can correspond to the task objectives for training product embedding generator 210. According to exemplary embodiments of the present disclosure, user actions that may be considered to be engagements and/or interactions may include, for example, clicking on a product, saving a product, adding a product to a cart, purchasing a product, and the like. Accordingly, combining the positive labels from multiple types of engagements and/or interactions into the same training batch can facilitate multi-task learning. For example, in a training batch of size $|B|$, $T_k$ positive examples may be allocated for each type of engagement and/or interaction $k \in \{1, \ldots, K\}$, such that $$|B| = \sum_{k=1}^{K} T_k.$$

Accordingly, $T_k$ may be tuned for the types of engagement and/or interaction, or other desired training tasks.

Additionally, negative training data may also be added to the training dataset. According to exemplary embodiments of the present disclosure, the negative training data may include a random sampling of products from the corpus of products, as well as certain engaged products from the query and engaged product pairs. The training dataset may be constructed by alternatingly loading a batch of positive training data and a batch of negative training data into a single training dataset.

According to exemplary embodiments of the present disclosure, training product embedding generator 210 may be viewed as a classification problem where, given an input query (e.g., an image-based query, a text-based query, etc.), product embedding generator 210 is trained to predict a product from the corpus of products with which a user will engage and/or interact. In exemplary implementations, $$\{x_i, y_i\}_{i=1}^{|B|}$$

may represent a training batch of query and engaged product pairs and $$B = \{y_i\}_{i=1}^{|B|}$$

may represent the set of engaged and/or interacted products in the batch. Accordingly, if C is used to represent the corpus of products, given pretrained embeddings $q_{x_i} \in R^d$ for queries $x_i$, it may be desirable to train product embedding generator 210 to learn embeddings $p_{y_i} \in R^d$ for engaged products $y_i$, such that $p_{y_i}$ is more similar to $q_{x_i}$ than other products in the corpus of products C. According to exemplary embodiments of the present disclosure, this may be achieved by minimizing a softmax loss function, which may be represented as:

$$L_s = -\frac{1}{|B|} \sum_{i=1}^{|B|} \log \frac{e^{\langle q_{x_i}, p_{y_i} \rangle}}{\sum_{y \in C} e^{\langle q_{x_i}, p_y \rangle}}$$

where $\langle \cdot, \cdot \rangle$ may represent a dot product function. Additionally, it may be noted that $\langle q_{x_i}, p_{x_i} \rangle$ may be the same as a similarity measure (e.g., cosine similarity) between the two embeddings $q_{x_i}$ and $p_{y_i}$, since they are $L_2$-normalized. According to certain aspects of the present disclosure, to reduce the computation of the loss function, rather than computing a summation over the entire corpus of products (e.g., the $$\sum_{y \in C} e^{\langle q_{x_i}, p_{x_i} \rangle}$$

term), the normalization term may be approximated by considering all other positive examples in the same training batch as negative and ignoring the remaining products in the corpus of products and applying a correction to address a potential sampling bias. For example, $\langle q_{x_i}, p_{x_i} \rangle$ may be updated to be $\langle q_{x_i}, p_{x_i} \rangle - \log Q_p(y|x_i)$, where $Q_p(y|x_i)$ may represent the probability of y being included as a positive example in the training batch. Applying the approximation and the correction, the loss function may be represented as:

$$L_{S_{pos}} = -\frac{1}{|B|} \sum_{i=1}^{|B|} \log \frac{e^{\langle q_{x_i}, p_{y_i} \rangle - \log Q_p(y_i|x_i)}}{\sum_{y \in B} e^{\langle q_{x_i}, p_y \rangle - \log Q_p(y|x_i)}}$$

According to exemplary embodiments of the present disclosure, the probabilities $Q_p(y|x_i)$ may be estimated in a streaming manner using, for example, a count-min sketch that tracks the frequencies with which the products appear in the training dataset. However, using in-batch positives as negatives in the training dataset can unfairly penalize popular products, as they are more likely to be provided a negative label and unengaged products in the corpus of product may never appear as negative labels. To mitigate these effects, according to certain aspects of the present disclosure, a random set of negatives N, where $|N| = |B|$, may be selected, and a further loss term may be computed, which may be represented as:

$$L_{S_{neg}} = -\frac{1}{|N|} \sum_{i=1}^{|N|} \log \frac{e^{\langle q_{x_i}, p_{y_i} \rangle - \log Q_n(y_i)}}{\sum_{y \in N} e^{\langle q_{x_i}, p_y \rangle - \log Q_n(y)}}$$

where $Q_n(y)$ may represent the probability of a random sampling product y. The $L_{S_{neg}}$ loss term may address the penalty that popular products may receive when used as a negative. Accordingly, in exemplary implementations, $L_{S_{pos}} + L_{S_{neg}}$ may be optimized, which may be represented as:

$$L_{S_{mixed}} = -\frac{1}{|B|} \sum_{i=1}^{|B|} \log \frac{e^{\langle q_{x_i}, p_{y_i} \rangle - \log Q_p(y_i|x_i)}}{\sum_{y \in B} e^{\langle q_{x_i}, p_y \rangle - \log Q_p(y|x_i)} + \sum_{y \in N} e^{\langle q_{x_i}, p_y \rangle - \log Q_n(y)}}$$

Figure 3:
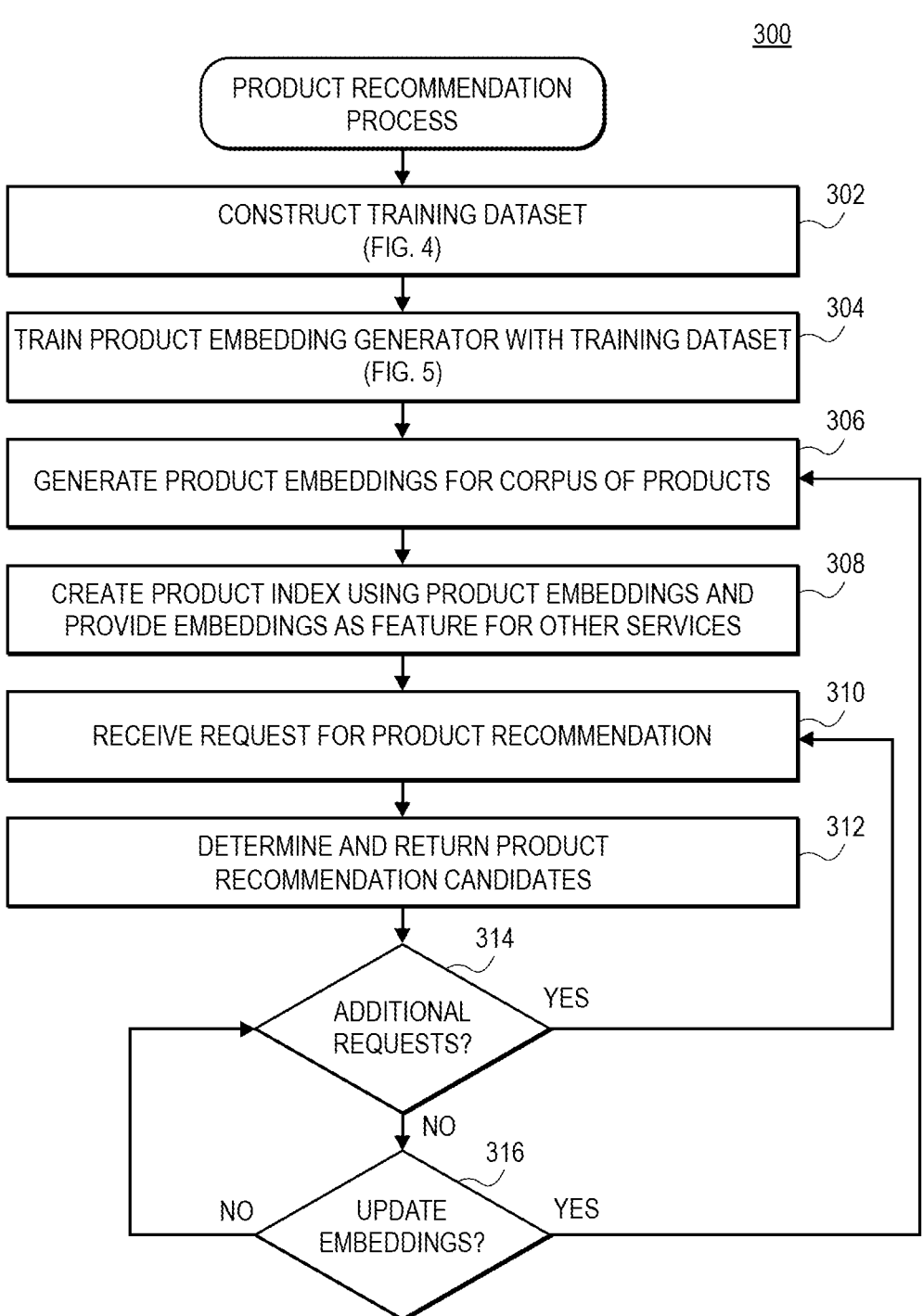
FIG. 3 is a flow diagram of an exemplary product recommendation process, according to exemplary embodiments of the present disclosure.

FIG. 3 is a flow diagram of an exemplary product recommendation process 300, according to exemplary embodiments of the present disclosure.

As shown in FIG. 3, process 300 may begin with constructing a training dataset, as in step 302. According to exemplary embodiments of the present disclosure, the training dataset may be constructed using labeled query and engaged product pairs. For example, positive training data may include labeled query and engaged product pairs, where each query-product pair may include a query and a corresponding product (from the corpus of products) with which users engaged and/or interacted in response to the respective query. The queries may include queries of different modalities (e.g., image-based queries, text-based queries, product queries, etc.), and the type of engagement and/or interaction can correspond to the various task objectives used in connection with training an exemplary product embedding generator according to exemplary embodiments of the present disclosure. In an example implementation, the user actions that may be considered to be engagements and/or interactions may include, for example, clicking on a product, saving a product, adding a product to a cart, purchasing a product, and the like. Accordingly, combining the positive labels from multiple types of engagements and/or interactions into the same training batch can facilitate multi-task learning. Additionally, the training dataset may also include negative training data. According to exemplary embodiments of the present disclosure, the negative training data may include a random sampling of products from the corpus of products, as well as engaged products from the query and engaged product pairs. The training dataset may be constructed by alternatingly loading a batch of positive training data and a batch of negative training data into a single training dataset. Construction of a training dataset is described in further detail herein in connection with FIGS. 2B and 4.

In step 304, a product embedding generator may be trained using the training dataset. According to exemplary embodiments of the present disclosure, the product embedding generator may be trained using the training dataset generated in step 302 using multi-task learning to learn product embeddings configured to predict a product from a corpus of products (e.g., a product catalog, etc.) with which a user is expected to engage and/or interact based on an input query. The trained product embedding generator may then be configured to generate product embeddings based on input product information, which may include a sequence of image information and text information (e.g., learned representations such as image embeddings and text embeddings that are representative of the image and text features and/or information associated with the product). Training of the product embedding generator is described in further detail herein in connection with FIGS. 2B and 5.

After the product embedding generator has been trained, the trained product embedding generator may be used to generate product embeddings for a plurality of products included in a corpus of products (e.g., a product catalog, etc.), as in step 306. According to exemplary embodiments of the present disclosure, the product embeddings may be generated for the products of the corpus of products periodically offline, in-batch. Further, the product embeddings may be periodically generated (e.g., offline, in-batch, etc.) to update the product embeddings based on updated and/or new information that may have been obtained in connection with the products and/or to generate product embeddings for new products that have been ingested into the corpus of products.

In step 308, a product index may be created using the product embeddings to maintain the corpus of products. According to exemplary embodiments of the present disclosure, the product index may be implemented as an HNSW graph, which may be searched (e.g., nearest neighbor search techniques, etc.) using queries received in connection with various recommendation services to identify, retrieve, and/or provide responsive, recommended products users. Each node and/or vertex of the HNSW graph may represent a product (e.g., represented by its associated corresponding product embedding) of the corpus of products and a measurement of proximity between the nodes and/or vertices can correspond to a similarity measurement between the products represented at the various nodes and/or vertices of the HNSW graph.

Optionally, the product embeddings may also be provided to other systems, services, and/or models for further processing. For example, the product embeddings may also be utilized as a feature in connection with one or more classifiers configured to infer further product information (e.g., category, gender, etc.) that may not be known and/or associated with a product and as a feature in one or more ranking models configured to determine a ranking and/or order of recommended products. Accordingly, the inferred further product information may be used to update the corpus of products and the rankings and/or order of recommended products may be used when presenting the recommended products to a user.

In step 310, a request for a product recommendation may be received. According to exemplary embodiments of the present disclosure, the request for recommended products may be received in connection with a user accessing a homepage and/or home feed, a user's interaction with a content item, a query, and the like. Further, the request for product recommendations may include a query (e.g., a text-based query, an image-based query, etc.) that may be provided to a recommendation service as an input. According to exemplary embodiments of the present disclosure, in connection with a user accessing a homepage and/or a home feed, a plurality of images (e.g., one or more learned representations, such as image embeddings, representative of the images, etc.) that may have been identified based on a user history or past activity associated with the user may be provided to the recommendation service as an input. In connection with a user's interaction with a content item, the content item with which the user interacted (e.g., a learned representation of the content item, such as an image embedding, etc.) may be provided to the recommendation service as an input. Similarly, in connection with a query submitted by as user, the text-based query itself (e.g., a learned representation of the text-based query, such as a text-embedding, etc.) may be provided to the recommendation service as an input.

Based on the input provided to the recommendation service, one or more recommended products may be determined, retrieved, and/or provided to the user, as in step 312. According to exemplary embodiments of the present disclosure, the product index generated in step 308 (e.g., a HNSW graph, etc.) may be searched (e.g., nearest neighbor search techniques, etc.) based on received inputs, queries, requests, etc. For example, a nearest neighbor search technique (e.g., k nearest neighbor search, approximate nearest neighbor search, locality-sensitivity hashing technique, and the like) may be employed to identify recommended products using the product index. Performing the nearest neighbor search may be include determining a similarity measure (e.g., using a cosine similarity measure, a Hamming distance, a Euclidean distance measure, and the like) between the inputs, queries, requests and the product embeddings of the product index to identify one or more nearest neighbors to the inputs, queries, requests as the recommended products. Alternatively and/or in addition, a random walk may be performed from one of the identified nearest neighbors to identify one or more additional products to provide as recommended products. Optionally, the identified recommended products may be ranked and/or ordered by one or more ranking applications based on the product embeddings. Accordingly, the ranked and/or ordered recommended products may be provided and/or presented to the user.

In step 314, it may be determined if there are additional requests for product recommendations. In the event that additional requests for product recommendations exist, process 300 may return to step 310 to receive the additional request for additional product recommendations. If there are no additional requests for product recommendations, in step 316 it may be determined whether the product embeddings are to be updated. For example, the product embeddings may be updated on a periodic basis (e.g., daily, weekly, monthly, upon a determination that a threshold number of new products have been ingested into the corpus of products, upon a determination that a threshold number of products have been updated with new product information, etc.) for a corpus of products (e.g., products included in a product catalog, etc.). If the product embeddings are to be updated, process 300 may return to step 306. However, if product embeddings are not to be updated, process 300 may return to step 314 to determine whether additional requests for product recommendations have been received.

Figure 4:
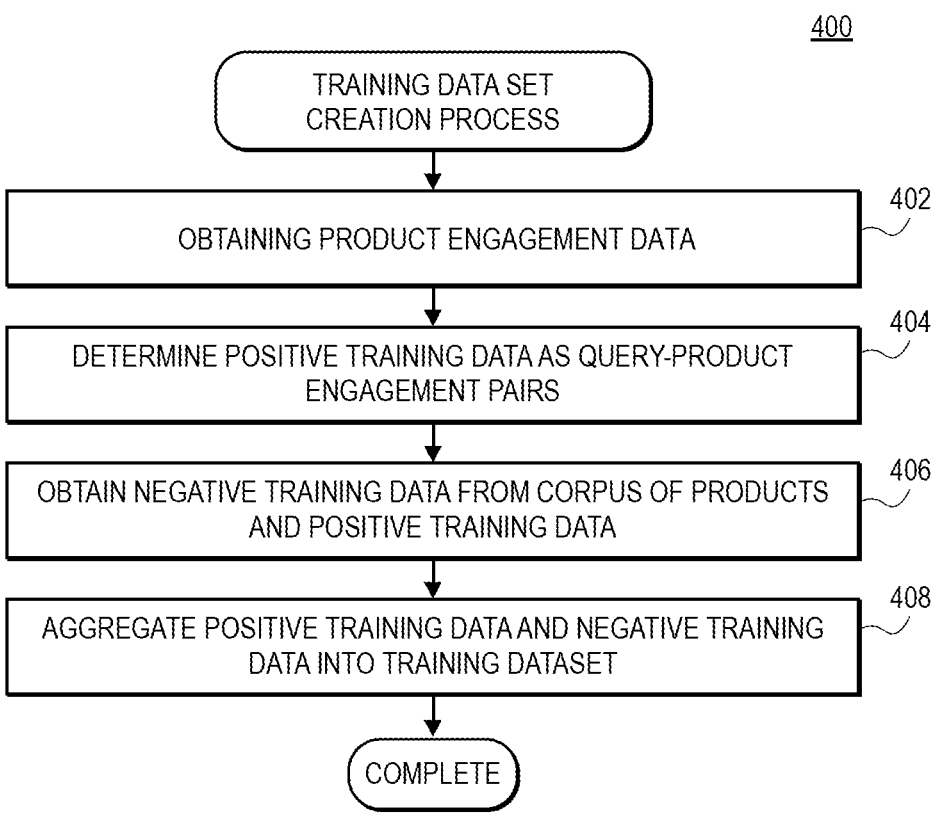
FIG. 4 is a flow diagram of an exemplary dataset creation process, according to exemplary embodiments of the present disclosure.

FIG. 4 is a flow diagram of an exemplary dataset creation process 400, according to exemplary embodiments of the present disclosure.

As shown in FIG. 4, process 400 may begin with obtaining product engagement data, as in step 402. According to exemplary embodiments of the present disclosure, the product engagement logs may be associated with various services and/or products, such as recommendation services, associated with an online service, such as a user's homepage and/or home feed, a user's past activity and/or history, user submitted queries, and the like.

In step 404, query and engaged product pairs are identified and labeled as positive training data. According to exemplary embodiments of the present disclosure, each query-product pair may include a query and a corresponding product (from the corpus of products) with which users engaged and/or interacted in response to the respective query. The queries may include queries of different modalities (e.g., image-based queries, text-based queries, etc.), and the type of engagement and/or interaction can correspond to the various task objectives used in connection with training a product embedding generator. According to exemplary embodiments of the present disclosure, user actions that may be considered to be engagements and/or interactions may include, for example, clicking on a product, saving a product, adding a product to a cart, purchasing a product, and the like. Accordingly, combining the positive labels from multiple types of engagements and/or interactions into the same training batch can facilitate multi-task learning.

In addition to generating positive training data, negative training data may also be compiled, as in step 406. For example, the negative training data may include a random sampling of products from the corpus of products, as well as certain engaged products from the query and engaged product pairs. The positive training data and the negative training data may then be aggregated into a training data set, as in step 408. For example, the training dataset may be constructed by alternatingly loading a batch of positive training data and a batch of negative training data into a single training dataset.

Figure 5:
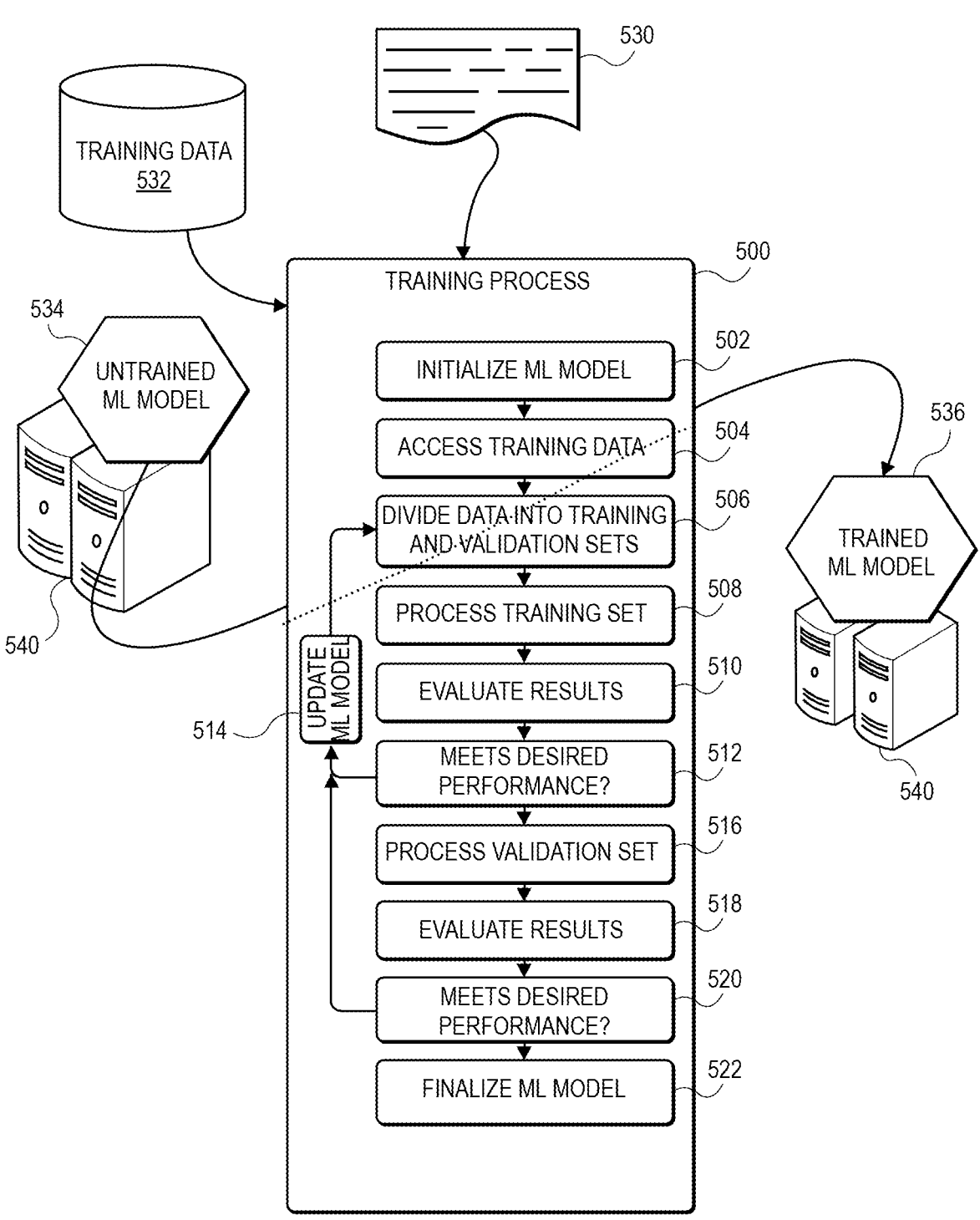
FIG. 5 is a flow diagram of an exemplary training process for training a machine learning model, according to exemplary embodiments of the present disclosure.

FIG. 5 is a flow diagram of an exemplary training process 500 for training a machine learning model, according to exemplary embodiments of the present disclosure.

As shown in FIG. 5, training process 500 is configured to train an untrained machine learning (ML) model 534 (e.g., such as a deep neural network, etc.) operating on computer system 540 to transform untrained ML model 534 into trained ML model 536 that operates on the same or another computer system, such as remote computing resource 120. According to exemplary embodiments of the present disclosure, training process 500 may be employed to train a product embedding generator. In the course of training, as shown in FIG. 5, at step 502, ML model 534 is initialized with training criteria 530. Training criteria 530 may include, but is not limited to, information as to a type of training, number of layers to be trained, training objectives, etc.

At step 504 of training process 500, corpus of training data 532, may be accessed. For example, training data 532 may include one or more query and engaged product pairs, as well as negative training examples, which may be sampled from a corpus of products and the query and engaged product pairs. Accordingly, accessing training data 532 can include accessing positive and negative labeled training data.

With training data 532 accessed, at step 506, training data 532 may be divided into training and validation sets. Generally speaking, the items of data in the training set are used to train untrained ML model 534 and the items of data in the validation set are used to validate the training of the ML model. As those skilled in the art will appreciate, and as described below in regard to much of the remainder of training process 500, there are numerous iterations of training and validation that occur during the training of the ML model.

At step 508 of training process 500, the data items of the training set are processed, often in an iterative manner. Processing the data items of the training set include capturing the processed results. After processing the items of the training set, at step 510, the aggregated results of processing the training set are evaluated, and at step 512, a determination is made as to whether a desired performance has been obtained. If the desired performance is not achieved, in step 514, aspects of the machine learning model are updated in an effort to guide the machine learning model to achieve the desired performance, and processing returns to step 506, where a new set of training data is selected, and the process repeats. Alternatively, if the desired performance is achieved, training process 500 advances to step 516.

At step 516, and much like step 508, the data items of the validation set are processed, and at step 518, the processing performance of this validation set is aggregated and evaluated. At step 520, a determination is made as to whether a desired performance, in processing the validation set, has been achieved. If the desired performance is not achieved, in step 514, aspects of the machine learning model are updated in an effort to guide the machine learning model to achieve the desired performance, and processing returns to step 506. Alternatively, if the desired performance is achieved, the training process 500 advances to step 522.

At step 522, a finalized, trained ML model 536 is generated. Typically, though not exclusively, as part of finalizing the now-trained ML model 536, portions of trained ML model 536 that are included in the model during training for training purposes are extracted, thereby generating a more efficient trained ML model 536.

Figure 6:
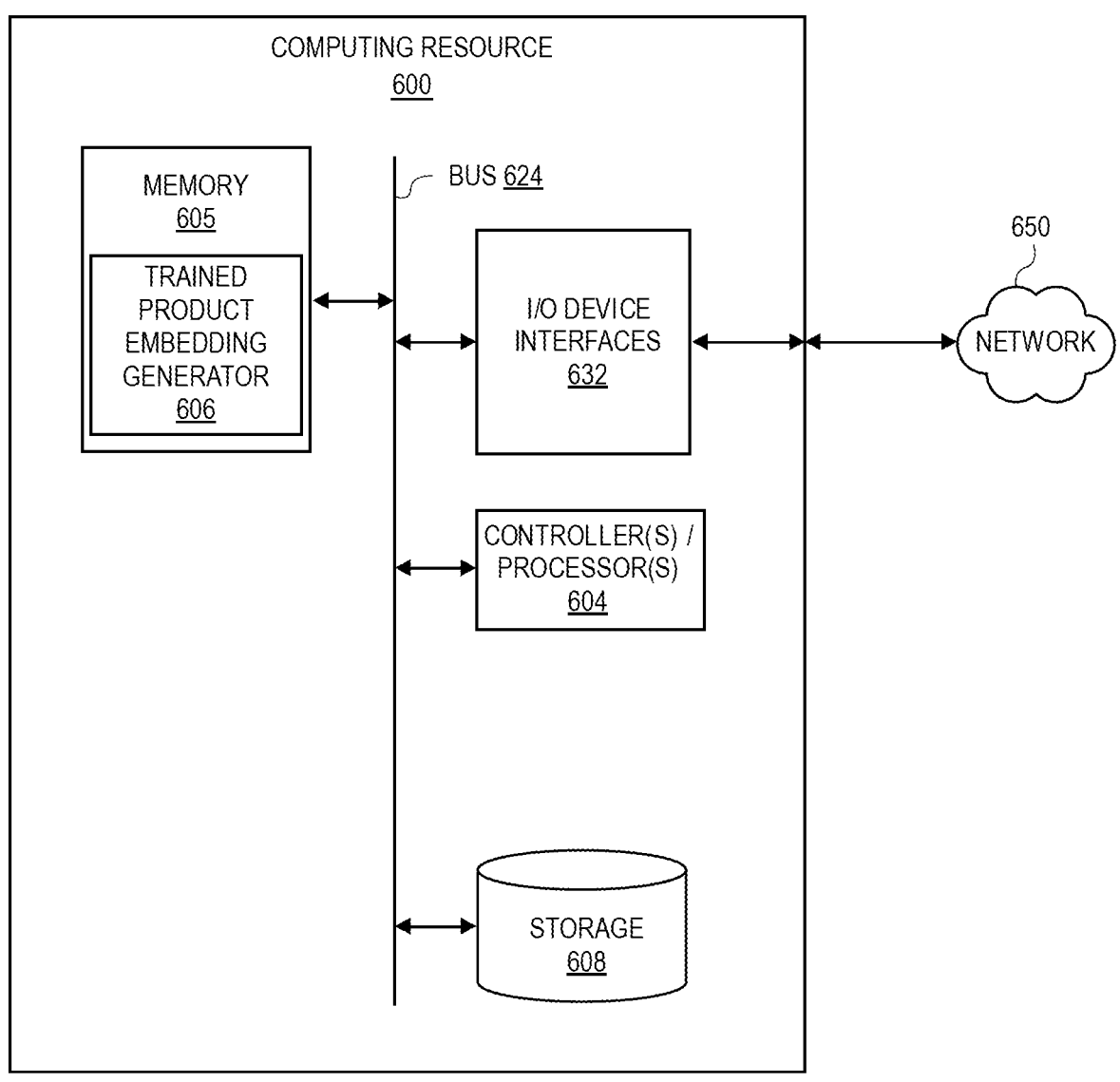
FIG. 6 is a block diagram of an exemplary computing resource, according to exemplary embodiments of the present disclosure.

FIG. 6 is a block diagram conceptually illustrating example components of a remote computing device, such as computing resource 600 (e.g., computing resources 120, etc.) that may be used with the described implementations, according to exemplary embodiments of the present disclosure.

Multiple such computing resources 600 may be included in the system. In operation, each of these devices (or groups of devices) may include computer-readable and computer-executable instructions that reside on computing resource 600, as will be discussed further below.

Computing resource 600 may include one or more controllers/processors 604, that may each include a CPU for processing data and computer-readable instructions, and memory 605 for storing data and instructions. Memory 605 may individually include volatile RAM, non-volatile ROM, non-volatile MRAM, and/or other types of memory. Computing resource 600 may also include a data storage component 608 for storing data, user actions, content items, products, a product index, a corpus of products, queries, etc. Each data storage component may individually include one or more non-volatile storage types such as magnetic storage, optical storage, solid-state storage, etc. Computing resource 600 may also be connected to removable or external non-volatile memory and/or storage (such as a removable memory card, memory key drive, networked storage, etc.), internal, and/or external networks 650 (e.g., the Internet) through input/output device interface 632.

Computer instructions for operating computing resource 600 and its various components may be executed by the controller(s)/processor(s) 604, using memory 605 as temporary "working" storage at runtime. The computer instructions may be stored in a non-transitory manner in non-volatile memory 605, storage 608, or an external device(s). Alternatively, some or all of the executable instructions may be embedded in hardware or firmware on computing resource 600 in addition to or instead of software.

For example, memory 605 may store program instructions that when executed by the controller(s)/processor(s) 604 cause the controller(s)/processor(s) 604 to process requests, product information, queries, and the like, using trained product embedding generator 606 to determine product embeddings that are representative of products based on product information of multiple modalities, which may be used in connection with recommending, identifying, etc. products to a user, as discussed herein.

Computing resource 600 also includes input/output device interface 632. A variety of components may be connected through input/output device interface 632. Additionally, computing resource 600 may include address/data bus 624 for conveying data among components of computing resource 600. Each component within computing resource 600 may also be directly connected to other components in addition to (or instead of) being connected to other components across bus 624.

The disclosed implementations discussed herein may be performed on one or more wearable devices, which may or may not include one or more sensors that generate time-series data, may be performed on a computing resource, such as computing resource 600 discussed with respect to FIG. 6, or performed on a combination of one or more computing resources. Further, the components of the computing resource 600, as illustrated in FIG. 6, are exemplary, and may be located as a stand-alone device or may be included, in whole or in part, as a component of a larger device or system.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Persons having ordinary skill in the field of computers, communications, media files, and machine learning should recognize that components and process steps described herein may be interchangeable with other components or steps, or combinations of components or steps, and still achieve the benefits and advantages of the present disclosure. Moreover, it should be apparent to one skilled in the art that the disclosure may be practiced without some, or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk and/or other media. In addition, components of one or more of the modules and engines may be implemented in firmware or hardware.

Moreover, with respect to the one or more methods or processes of the present disclosure shown or described herein, including but not limited to the flow charts shown in FIGS. 3-5, orders in which such methods or processes are presented are not intended to be construed as any limitation on the claims, and any number of the method or process steps or boxes described herein can be combined in any order and/or in parallel to implement the methods or processes described herein. In addition, some process steps or boxes may be optional. Also, the drawings herein are not drawn to scale.

The elements of a method, process, or algorithm described in connection with the implementations disclosed herein can also be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be any of X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" or "a device operable to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

Although the invention has been described and illustrated with respect to illustrative implementations thereof, the foregoing and various other additions and omissions may be made therein and thereto without departing from the spirit and scope of the present disclosure.

What is claimed is:

1. A computer-implemented method, comprising:
accessing a plurality of training data including a plurality of query and engaged product pairs, wherein the plurality of query and engaged product pairs includes queries of different modalities including a plurality of image queries, and a plurality of text queries, and a plurality of engaged products associated with a plurality of engagement types;
training a first machine learning model using the plurality of training data to configure the first machine learning model to generate, based at least in part on at least one of image information or text information associated with a product, a product embedding representative of the product according to multiple task objectives, the product embedding being compatible with multiple modalities such that a distance measure between the product embedding and respective embeddings of different modalities represents a relevance of the product embedding to the respective embeddings;
generating an index based at least in part on a plurality of product embeddings generated by the first trained machine learning model, wherein the plurality of product embeddings corresponds to a first plurality of products, and wherein the plurality of product embeddings are compatible with different query modalities;
receiving a query that includes a representation of at least one of an image query, a text query, or a product query; and
determining, based at least in part on an embedding of the representation and the index, a second plurality of products from the first plurality of products as recommended products, the determining comprising calculating a distance measure between the embedding of the representation and one or more product embeddings in the index.

2. The computer-implemented method of claim 1, wherein the plurality of product embeddings are compatible with a first learned representation of an image and a second learned representation of a text string.

3. The computer-implemented method of claim 2, wherein the first learned representation of the image and the second learned representation of the text string are incompatible.

4. The computer-implemented method of claim 1, wherein one or more product embeddings of the plurality of product embeddings are generated based at least in part on a plurality of image information associated with a respective product of the first plurality of products and a plurality of text information associated with the respective product of the first plurality of products.

5. The computer-implemented method of claim 1, wherein determining the second plurality of products includes performing a nearest neighbor technique.

6. A computing system, comprising:
one or more processors; and
a memory storing program instructions that, when executed by the one or more processors, cause the one or more processors to at least:
receive a plurality of product information associated with a plurality of products, wherein one or more products of the plurality of products is associated with product information that includes image product information and text product information;
determine, using a trained product embedding generator and based at least in part on the image product information and text product information associated with one or more products of the plurality of products, a respective product embedding for one or more products of the plurality of products, the respective product embeddings being compatible with multiple modalities such that a distance measure between a product embedding and respective embeddings of different modalities represents a relevance of the product embedding to the respective embeddings;
generate, based at least in part on the respective product embeddings for the plurality of products, a product index;
receive a request for recommended products from one of a plurality of recommendation services, the plurality of recommendation services including two or more recommendation services configured to receive respective inputs of different modalities, wherein the request includes one of a plurality of modalities including: an image query, a text query, or a product query;

determine, based at least in part on an embedding of the image query or an embedding of the text query and the product index, a plurality of recommended products, the determining comprising calculating a distance measure between the embedding of the image query or the text query and one or more product embeddings in the index; and provide at least a portion of the plurality of recommended products as a response to the request.

7. The computing system of claim 6, wherein the image product information includes a plurality of image embeddings corresponding to a plurality of images associated with the product and the text product information includes a plurality of text strings associated with the product.

8. The computing system of claim 7, wherein the plurality of text strings are processed using a hash embedding technique.

9. The computing system of claim 6, wherein:

the trained product embedding generator is trained using positive engagements associated with a plurality of engagement types; and the plurality of engagement types includes at least one of:

clicking a first product;

saving a second product;

adding a third product to a cart; or purchasing a fourth product.

10. The computing system of claim 6, wherein:

the product index supports a plurality of recommendation services; and at least one of the plurality of recommendation services determines the plurality of recommended products.

11. The computing system of claim 6, wherein respective product embeddings are compatible with a first learned representation of an image and a second learned representation of a text string, such that a distance between a first product embedding and the first learned representation and the second learned representation represents a relevance of the first learned representation and the second learned representation to the first product embedding.

12. The computing system of claim 6, wherein the product index includes a hierarchical navigable small worlds (HNSW) graph.

13. The computing system of claim 6, wherein determining the plurality of recommended products includes performing a nearest neighbor search technique.

14. The computing system of claim 6, wherein the instructions, when executed by the one or more processors, further cause the one or more processors to at least:

process at least a portion of the respective product embeddings using a ranking service to determine a ranking associated with the plurality of recommended products; and cause at least a portion of the plurality of recommended products to be presented to a user in accordance with the ranking.

15. The computing system of claim 6, wherein the instructions, when executed by the one or more processors, further cause the one or more processors to at least process at least a portion of the respective product embeddings using a trained classifier to determine a further product information associated with at least one of the plurality of products.

16. One or more non-transitory computer readable storage media having instructions that, when executed by the one or more computers, cause the one or more computers to perform operations comprising:

accessing a plurality of training data including a plurality of query and engaged product pairs, wherein the plurality of query and engaged product pairs includes queries of different modalities including a plurality of image queries, and a plurality of text queries, and a plurality of engaged products associated with a plurality of engagement types;

training a first machine learning model using the plurality of training data to configure the first machine learning model to generate, based at least in part on at least one of image information or text information associated with a product, a product embedding representative of the product according to multiple task objectives, the product embedding being compatible with multiple modalities such that a distance measure between the product embedding and respective embeddings of different modalities represents a relevance of the product embedding to the respective embeddings;

generating an index based at least in part on a plurality of product embeddings generated by the first trained machine learning model, wherein the plurality of product embeddings corresponds to a first plurality of products, and wherein the plurality of product embeddings are compatible with different query modalities;

receiving a query that includes a representation of at least one of an image query, a text query, or a product query; and determining, based at least in part on an embedding of the representation and the index, a second plurality of products from the first plurality of products as recommended products, the determining comprising calculating a distance measure between the embedding of the representation and one or more product embeddings in the index.

17. The one or more non-transitory computer readable storage media of claim 16, wherein the plurality of product embeddings are compatible with a first learned representation of an image and a second learned representation of a text string.

18. The one or more non-transitory computer readable storage media of claim 17, wherein the first learned representation of the image and the second learned representation of the text string are incompatible.

19. The one or more non-transitory computer readable storage media of claim 16, wherein one or more product embeddings of the plurality of product embeddings are generated based at least in part on a plurality of image information associated with a respective product of the first plurality of products and a plurality of text information associated with the respective product of the first plurality of products.

20. The one or more non-transitory computer readable storage media of claim 16, wherein determining the second plurality of products includes performing a nearest neighbor technique.

* * * * *